United States Patent
Harish et al.

(10) Patent No.: US 7,570,065 B2
(45) Date of Patent: *Aug. 4, 2009

(54) CYLINDRICAL CAPACITIVE FORCE SENSING DEVICE AND METHOD

(75) Inventors: Divyasimha Harish, Union City, CA (US); William D. Dallenbach, Sunnyvale, CA (US); King Wong, Saratoga, CA (US); John Schultz, Santa Clara, CA (US)

(73) Assignee: Loadstar Sensors Inc, Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/365,358

(22) Filed: Mar. 1, 2006

(65) Prior Publication Data

US 2007/0205776 A1   Sep. 6, 2007

(51) Int. Cl.
*G01R 27/26* (2006.01)
*G01L 1/00* (2006.01)

(52) U.S. Cl. .................. 324/662; 324/661; 324/686; 73/780; 73/862.626

(58) Field of Classification Search .......... 324/658, 324/661, 662, 684–686
See application file for complete search history.

(56) References Cited

U.S. PATENT DOCUMENTS

| | | |
|---|---|---|
| 3,336,525 A | 8/1967 | Church |
| 3,646,433 A | 2/1972 | Eilersen |
| 3,698,249 A | 10/1972 | Weaver |
| 3,805,150 A * | 4/1974 | Abbe ............ 324/662 |
| 3,859,575 A | 1/1975 | Lee et al. |
| 3,880,008 A | 4/1975 | Eilersen |
| 4,042,876 A | 8/1977 | Visioli, Jr. |
| 4,054,833 A | 10/1977 | Briefer |
| 4,084,438 A | 4/1978 | Lee |
| 4,093,915 A | 6/1978 | Briefer |

(Continued)

FOREIGN PATENT DOCUMENTS

CH   0409439   3/1966

(Continued)

OTHER PUBLICATIONS

"Eilersen Electric Digital Weighing Systems", http://www.eilersen.com/, 1 pg., 2006.

(Continued)

*Primary Examiner*—Timothy J Dole
(74) *Attorney, Agent, or Firm*—Raj Abhyanker LLP

(57) ABSTRACT

Cylindrical capacitance force sensing device/method is disclosed. In one embodiment, an apparatus includes a capacitor having two parallel conductive surfaces, a cylindrical housing with a cover plate to encompass the capacitor, and a sensor in the cylindrical housing to generate a measurement based on a change in a distance between the two conductive surfaces when the cover plate is deflected by a load applied on the cover plate. In another embodiment, a method may include applying a load on top of a housing which encompasses a capacitive sensor having two parallel conductive surfaces to produce a deflection of a cover plate of the housing, automatically generating a measurement from the capacitive sensor when a distance between the two parallel conductive surfaces is charged due to the deflection of the cover plate, and decreasing an error in the measurement via stabilizing to a mounting surface.

18 Claims, 13 Drawing Sheets

U.S. PATENT DOCUMENTS

| | | | |
|---|---|---|---|
| 4,175,428 A | 11/1979 | Eilersen | |
| 4,227,418 A | 10/1980 | Bonner et al. | |
| 4,229,776 A | 10/1980 | Antikainen et al. | |
| 4,288,835 A * | 9/1981 | Lee et al. | 73/718 |
| 4,358,814 A | 11/1982 | Lee et al. | |
| 4,382,479 A | 5/1983 | Lee et al. | |
| 4,383,586 A | 5/1983 | Lee | |
| 4,384,496 A * | 5/1983 | Gladwin | 73/862.626 |
| 4,386,312 A | 5/1983 | Briefer | |
| 4,433,742 A | 2/1984 | Lee | |
| 4,434,203 A | 2/1984 | Briefer | |
| 4,434,451 A | 2/1984 | Delatorre | |
| 4,448,085 A | 5/1984 | Lee | |
| 4,463,614 A | 8/1984 | Lee | |
| 4,464,725 A | 8/1984 | Briefer | |
| 4,513,831 A | 4/1985 | Lee et al. | |
| 4,550,611 A * | 11/1985 | Czarnocki | 73/708 |
| 4,558,600 A | 12/1985 | Lee | |
| 4,603,308 A | 7/1986 | Briefer | |
| 4,649,759 A | 3/1987 | Lee | |
| 4,846,293 A | 7/1989 | Li | |
| 4,864,463 A * | 9/1989 | Shkedi et al. | 361/283.4 |
| 4,899,600 A | 2/1990 | Lee | |
| 4,949,054 A | 8/1990 | Briefer | |
| 5,023,966 A | 6/1991 | Eilersen | |
| 5,024,099 A | 6/1991 | Lee | |
| 5,078,220 A | 1/1992 | Briefer | |
| 5,115,676 A | 5/1992 | Lee | |
| 5,150,275 A | 9/1992 | Lee et al. | |
| 5,194,819 A | 3/1993 | Briefer | |
| 5,302,894 A | 4/1994 | Hrubes | |
| 5,379,653 A * | 1/1995 | Saner | 73/862.59 |
| 5,442,962 A | 8/1995 | Lee | |
| 5,542,300 A | 8/1996 | Lee | |
| 5,604,315 A | 2/1997 | Briefer et al. | |
| 5,705,751 A | 1/1998 | Briefer et al. | |
| 5,798,462 A | 8/1998 | Briefer et al. | |
| 5,900,592 A * | 5/1999 | Sohns et al. | 73/862.68 |
| 5,939,639 A | 8/1999 | Lethbridge | |
| 6,014,800 A | 1/2000 | Lee | |
| 6,019,002 A | 2/2000 | Lee | |
| 6,026,694 A * | 2/2000 | Gray | 73/862.68 |
| 6,180,892 B1 | 1/2001 | Li | |
| 6,191,722 B1 | 2/2001 | Briefer | |
| 6,205,861 B1 | 3/2001 | Lee | |
| 6,257,068 B1 | 7/2001 | Briefer et al. | |
| 6,316,948 B1 | 11/2001 | Briefer | |
| 6,345,543 B1 * | 2/2002 | Aoki | 73/862.474 |
| 6,487,911 B1 * | 12/2002 | Frackelton et al. | 73/718 |
| 6,496,019 B1 | 12/2002 | Briefer | |
| 6,532,834 B1 | 3/2003 | Pinto et al. | |
| 6,718,827 B1 | 4/2004 | Lee et al. | |
| 6,789,429 B2 | 9/2004 | Pinto et al. | |
| 2005/0066742 A1 | 3/2005 | Eilersen | |
| 2005/0132820 A1 | 6/2005 | Eilersen | |
| 2005/0229710 A1 * | 10/2005 | O'Dowd et al. | 73/718 |
| 2006/0065973 A1 * | 3/2006 | Dallenbach et al. | 257/712 |
| 2007/0193361 A1 * | 8/2007 | Coffey et al. | 73/780 |

FOREIGN PATENT DOCUMENTS

| | | |
|---|---|---|
| DE | 2514511 | 10/1975 |
| DE | 3718292 A1 | 10/1987 |
| DE | 4330808 | 3/1995 |
| DE | 4420691 | 1/1996 |
| EP | 0074574 A1 | 3/1983 |
| EP | 0131024 B1 | 10/1986 |
| EP | 0335385 A3 | 10/1989 |
| EP | 0340190 A1 | 11/1989 |
| EP | 0412926 A1 | 2/1991 |
| EP | 0412926 B1 | 2/1991 |
| EP | 0431067 A4 | 6/1991 |
| EP | 0438413 A4 | 7/1991 |
| EP | 0340190 B1 | 7/1992 |
| EP | 0500783 A4 | 9/1992 |
| EP | 0438413 B1 | 3/1993 |
| EP | 0714505 A4 | 6/1996 |
| EP | 0500783 B1 | 10/1996 |
| EP | 0741906 A4 | 11/1996 |
| EP | 0830577 A4 | 3/1998 |
| EP | 0969287 A2 | 1/2000 |
| EP | 0741906 B1 | 6/2000 |
| EP | 1038161 A4 | 9/2000 |
| EP | 0714505 B1 | 2/2001 |
| EP | 1117052 A1 | 7/2001 |
| EP | 0969287 A3 | 1/2003 |
| EP | 1038161 B1 | 5/2003 |
| EP | 1386173 B1 | 10/2004 |
| EP | 1451538 B1 | 8/2005 |
| FR | 2102161 | 7/1972 |
| JP | 56114404 A | 9/1981 |
| JP | 59022404 A | 2/1984 |
| JP | 61077733 | 4/1986 |
| WO | WO-8402780 A1 | 7/1984 |
| WO | WO-02075331 A1 | 9/2002 |
| WO | WO-02077593 A1 | 10/2002 |
| WO | WO-03048700 A2 | 6/2003 |
| WO | WO-03048700 A3 | 6/2003 |

OTHER PUBLICATIONS

"Model MCL Internally Amplified Miniature Tension/Compression Load Cell", http://www.rdpelectrosense.com/load/mcl.htm, 3 pages, May 19, 2004.

"Weighing Systems: Scales, Balances and Load Cells:Setra", *Setra Weighing Systems Division*; http://www.setra.com/wei/index.htm, 2 Pages, 1998.

* cited by examiner

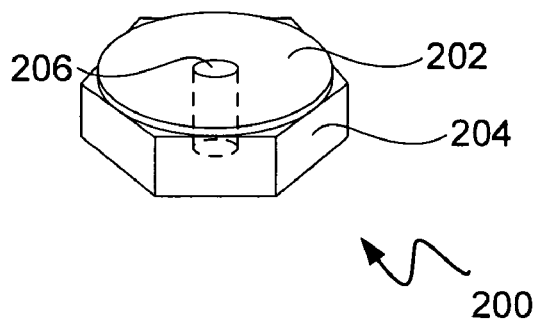
FIGURE 2A (TOP VIEW)
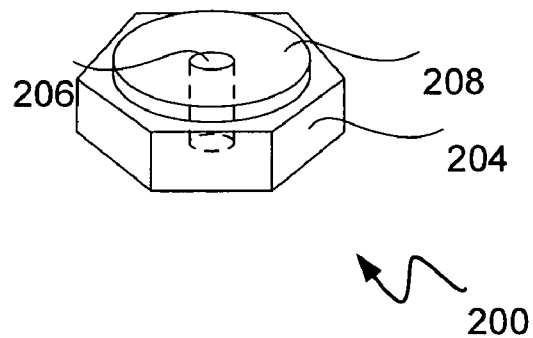
FIGURE 2B (BOTTOM VIEW)

CYLINDRICAL CAPACITIVE FORCE SENSING DEVICE AND METHOD

FIELD OF TECHNOLOGY

This disclosure relates generally to technical fields of measuring devices and, in one embodiment, to a cylindrical capacitance force sensing apparatus and method.

BACKGROUND

A surface may be an external geometry of an object which may be present in a variety of conditions. For example, the surface may be an even surface or an uneven surface (e.g., which may make an object sitting on the surface wobbly). A force (e.g., a load, a pressure, etc.) may be applied on a measuring device (e.g., a force measuring device) which may sit on the surface.

The measuring device sitting on the uneven surface may be unstable (e.g., not constant, fluctuating, etc.). When a load is applied on the unstable measuring device, the measuring device may produce an error in measurement (e.g., as different values may be obtained for the load weighed on the measuring device because the load may exert different forces when the measuring device vacillates between a ridge and a valley of the uneven surface).

The measuring device may come in a variety of shapes. A shape of a surface of the measuring device that comes in contact with the force may affect deflection and/or bending of the surface (e.g., thereby increasing and/or decreasing a sensitivity of the measurement). The shape of the surface may also affect a wear and tear of the measuring device (e.g., thus durability of the measuring device) due to a strain and/or stress put on the surface.

SUMMARY

A cylindrical capacitance force sensing device/method is disclosed. In one aspect, an apparatus includes a capacitor having an upper conductive surface and a lower conductive surface parallel to the upper conductive surface, a cylindrical housing (e.g., the cylindrical housing may encompass a reference capacitor to compensate an error in a measurement based on an environmental condition) with a cover plate to encompass the capacitor, and a sensor in the cylindrical housing (e.g., which may be made of a conductive material and/or a nonconductive material to isolate any electronic module in the cylindrical housing from an external electromagnetic noise) to generate a measurement based on a change in a distance between the upper conductive surface and the lower conductive surface when the cover plate is deflected by a load applied on the cover plate.

One or more (e.g. three) support bases (e.g., a shape of one end of the support bases contacting a mounting surface is designed to optimize a contact between the cylindrical housing and the mounting surface when the support bases are affixed on the mounting surface) may be adjoined (e.g., welded, molded, milled, etc) to a bottom surface of the cylindrical housing. For example, the support bases may be a convex shape or a saw-blade shape. Also, a groove (e.g., where a depth and a width of the groove is mathematically engineered to configure a sensitivity of a deflection of the cover plate) may be formed on a side or both sides of the cover plate to substantially confine the deflection of the cover plate in the groove.

Further, a modular spacer may be placed between the cover plate and the upper conductive surface to provide a gap between the upper conductive surface and the lower conductive surface and/or to buffer an effect of the load on the upper conductive surface. A top nut affixed on a center of the cover plate and a support structure associated with the load may be fastened to an upper inner chamber of the top nut using an upper fastener (e.g., while the cover plate, the modular spacer and/or the upper conductive surface may be fastened to a lower inner chamber of the top nut using a lower fastener).

The apparatus may also include a layered printed circuit board (e.g., the layered printed circuit board may include a ground plane layer, a power plane layer, and one or more signaling layers having a circuit which generates the measurement encased by the ground plane layer and the power plane layer associated with the sensor). The signaling layers may further include a circuit to wirelessly communicate the measurement with a data processing system.

In another aspect, a method includes applying a load on top of a housing which encompasses a capacitive sensor having two parallel conductive surfaces to produce a deflection of a cover plate of the housing, automatically generating a measurement from the capacitive sensor when a distance between the two parallel conductive surfaces is changed due to the deflection of the cover plate, and decreasing an error in the measurement through stabilizing the housing to a mounting surface. The method may further include changing a thickness of a modular spacer placed between the cover plate of the housing and an upper conductive surface of the two parallel conductive surfaces to determine (e.g., set up, configure, calibrate, etc.) the distance (e.g., initial distance) between the two parallel conductive plates.

The method may also include forming a groove on a side or both sides of the cover plate to confine (e.g., substantially) the deflection of the cover plate due to the load in the groove (e.g., a depth and a width of the groove is mathematically calibrated to configure a rate of the deflection). The method may further include masking one or more signaling layers (e.g., which may further include a circuit to communicate an alarm signal when the load exceeds a threshold value) of a layered printed circuit board associated with the capacitive sensor between a power plane layer and a ground plane layer to reduce an external electromagnetic noise. In addition, the method may further include varying a size of a cylindrical object protruding from a bottom surface of a top nut coupled to the cover plate to configure a deflection rate of the cover plate.

The method may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIGS. 2A and 2B are exploded top and bottom views of a top nut to adjoin a force exerting object to the cover plate of the force-measuring device of FIG. 1, according to one embodiment.

Other features of the present embodiments will be apparent from the accompanying drawings and from the detailed description that follows.

DETAILED DESCRIPTION

Cylindrical capacitance force sensing apparatus/method is disclosed. In the following description, for purposes of explanation, numerous specific details are set forth in order to provide a thorough understanding of the various embodiments. It will be evident, however, to one skilled in the art that the various embodiments may be practiced without these specific details. An example embodiment provides methods and apparatuses to automatically generate a measurement associated with a capacitor based on a change in a distance between two parallel conductive surfaces forming the capacitor. The change in the distance between the two parallel conductive surfaces may take place when a cover plate of a cylinder encompassing the capacitor is deflected by a load applied on the cover plate, thereby pressing down (e.g., causing to move down) an upper conductive surface of the two parallel conductive surface towards the lower conductive surface (e.g., hence a change in capacitance of the capacitor). A reference capacitor may be used to adjust the measurement based on at least one environmental condition.

In addition, in another embodiment, a method may include applying a load on top of a housing which encompasses a capacitive sensor having two parallel conductive surfaces to produce a deflection in a cover plate of the housing, automatically generating a measurement from the capacitive sensor when a distance between the two parallel conductive surfaces is changed due to the deflection of the cover plate, and decreasing an error in the measurement through stabilizing the housing to a mounting surface. Also, the method may be in a form of a machine-readable medium embodying a set of instructions that, when executed by a machine, cause the machine to perform any method disclosed herein. Example embodiments of a method and an apparatus, as described below, may be used to provide a high-accuracy, low-cost, and high-longevity load sensing device (e.g., load sensors, pressure sensors, etc.). It will be appreciated that the various embodiments discussed herein may/may not be the same embodiment, and may be grouped into various other embodiments not explicitly disclosed herein.

Figure 1:
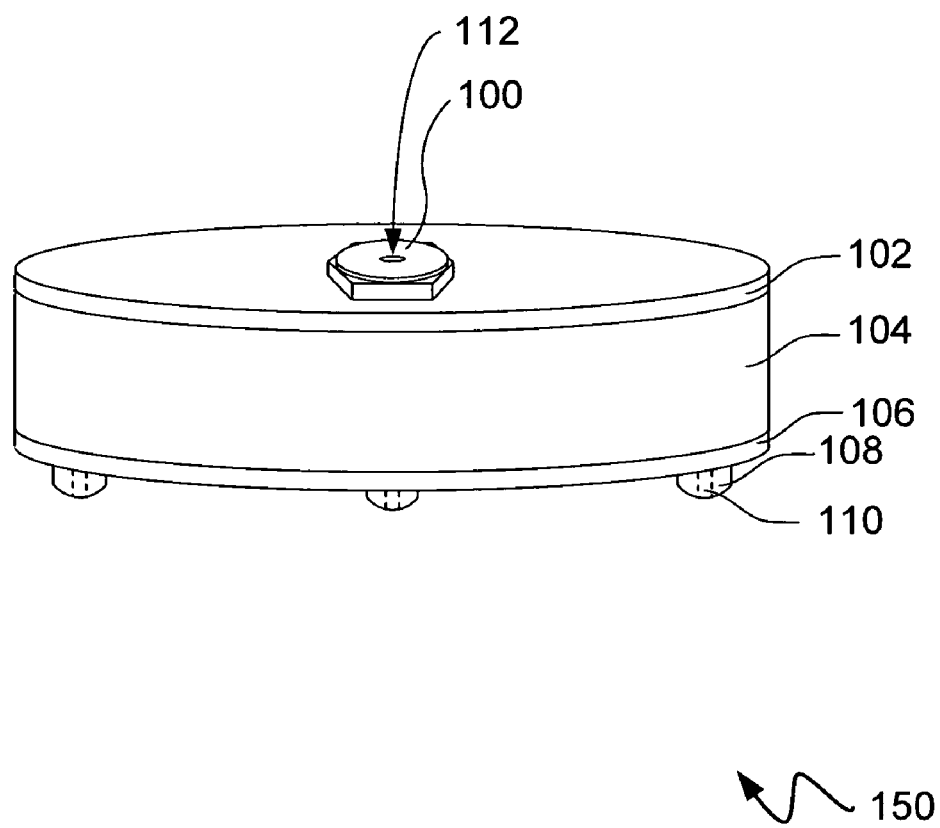
FIG. 1 is a three-dimensional view of a force-measuring device having a sensor capacitor and a reference capacitor, according to one embodiment.

FIG. 1 is a three-dimensional view of a force-measuring device 150 having a sensor capacitor (e.g., a sensor capacitor consisting of an upper ring surface 614 of FIG. 6 and a lower ring surface 722 of FIG. 7) and a reference capacitor (e.g., a reference capacitor consisting of an upper surface 724 of FIG. 7 and a lower surface 730) according to one embodiment. The force-measuring device 150 (e.g., a cylindrical device) may include a top nut 100, a cover plate 102, a middle cylinder 104, a bottom plate 106, and a plurality of support bases 108 (e.g., feet, legs, etc.) each with a hole 110 (e.g., threaded or unthreaded).

In one example embodiment, a force 112 (e.g., a load, a weight, a pressure, etc.) may be applied on top of the top nut 100 deflecting the cover plate 102. The cover plate 102 deflected by the force 112 may move down an upper sensor printed circuit board (PCB) 612 of FIG. 6 (e.g., having the upper ring surface 614) of the sensor capacitor toward a consolidated PCB 720 producing a change in capacitance. In another example embodiment, a housing (e.g., which may include the cover plate 102, the middle cylinder 104, and the bottom plate 106, or may include a different structure) may be made of a conductive and/or nonconductive material. In case the nonconductive material is being used, the nonconductive material may be painted (e.g., sputtered, coated, etc.) with the conductive material. The various components of the force-measuring device 150 may be best understood with reference to FIGS. 2-8.

FIGS. 2A and 2B are exploded top and bottom views of a top nut 200 to adjoin a force exerting object to the cover plate 102 of the force-measuring device of FIG. 1, according to one embodiment. The top nut 200 may be processed (e.g., milled, turned, marked out, welded, hand-fabricated, grinded, etc.) to have an upper cylinder 202 and a lower cylinder 208 protruding from a nut body 204 (e.g., which may come in a number of shapes) and an inner chamber 206 penetrating a center of the top nut 200.

As illustrated in FIG. 2A, the upper cylinder 202 may provide a substantial contact surface for a force (e.g., the force 112 of FIG. 1) being applied to a device (e.g., the force-measuring device 150 of FIG. 1), according to one embodiment. The inner chamber 206 (e.g., which may be a threaded hole) may be used to adjoin an object which exerts the force to the device using a fastener (e.g., a screw, bolt, etc.) which may occupy an upper half of the inner chamber 206. As illustrated in FIG. 2B, the top nut 200 also includes the lower cylinder 208 which protrudes from the nut body 204, according to one embodiment. The lower cylinder 208 may be modified (e.g., by changing a radius and/or a height of the lower cylinder 208) to calibrate a deflection rate of a surface (e.g., the cover plate 102) which comes in contact with the lower cylinder 208, as will be illustrated in FIGS. 9A and 9B.

Figure 3:
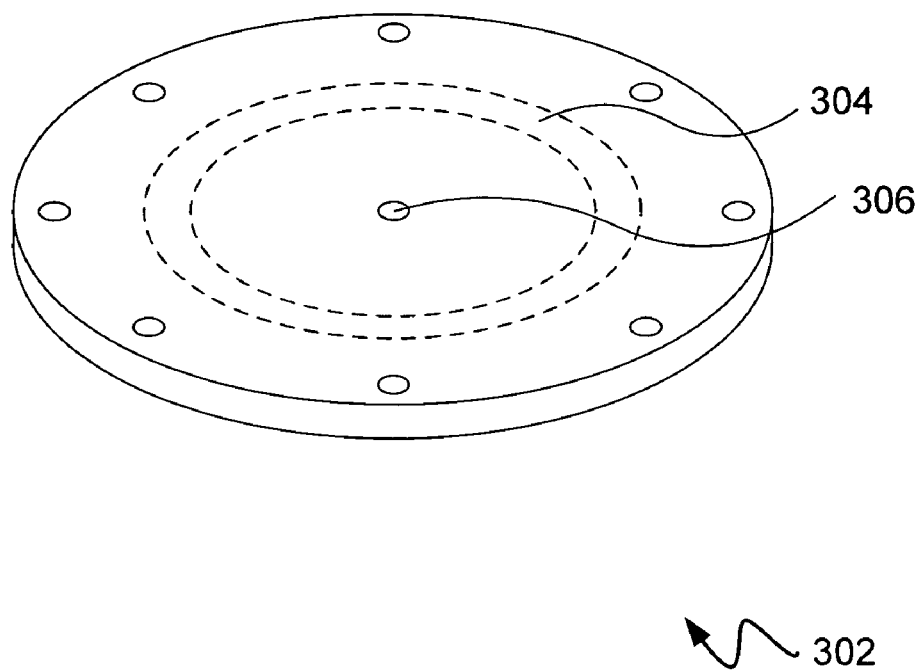
FIG. 3 is a three-dimensional view of the cover plate of FIG. 1 with a groove, according to one embodiment.

FIG. 3 is a three-dimensional view of the cover plate 302 of FIG. 1 having a groove 304, according to one embodiment. The cover plate 302 may be made of a conductive material (e.g., a stainless steel) and/or a nonconductive material to isolate any electronic module (e.g., PCBs) in the housing from an external electromagnetic noise. The groove 304 (e.g., of a ring shape having an inner radius and an outer radius) may be formed to substantially confine a force (e.g., the force 112 of FIG. 1) within the cover plate 302. The groove 304 may be formed on a top surface of the cover plate 302 and/or on a bottom surface of the cover plate 302. Furthermore, a depth, a width and two radii of the groove 304 may be engineered (e.g., mathematically, algorithmically, etc.) to provide a deflection rate that may be determined for the force measuring device 150 of FIG. 1. A hole 306 which penetrates through a center of the cover plate 302 may provide a space for a fastener (e.g., a screw 618) to affix other components (e.g., the top nut 100, a modular spacer 610, the upper sensor PCB 612, etc.) to the cover plate 302.

Figure 4A:
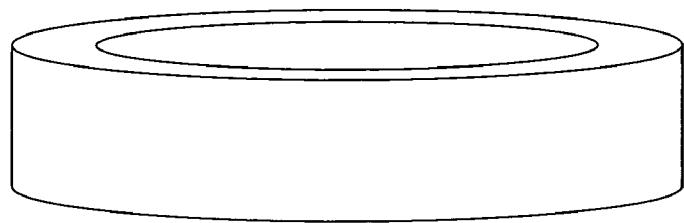
FIGS. 4A and 4B are three-dimensional views of a milled body of the force-measuring device of FIG. 1 and a layered body of the force-measuring device, respectively, according to one embodiment.
Figure 4B:
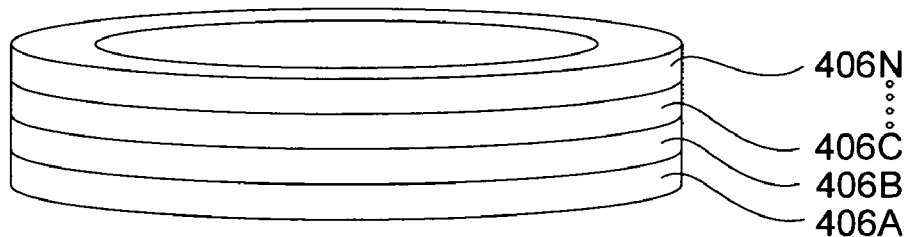

FIGS. 4A and 4B are three-dimensional views of a milled body of the force-measuring device 150 of FIG. 1 and a layered body of the force-measuring device 150, respectively, according to one embodiment. FIG. 4A is a three-dimensional view of a single layer of a material that can be used to encompass the sensor capacitor and the reference capacitor in the force-measuring device 150 of FIG. 1, according to one embodiment. Particularly, FIG. 4A illustrates a middle cylinder 404A formed with a single block of material, according to one embodiment. The middle cylinder 404A (e.g., a ring shape) may be formed using a variety of processes (e.g., of milling, turning, marking out, welding, hand-fabrication, grinding, etc.). The middle cylinder 404A may be made of a conductive material (e.g., a stainless steel, a metal alloy, etc.) and/or nonconductive material to isolate any electronic module (e.g., PCBs) in the middle cylinder 404A from an external electromagnetic noise.

FIG. 4B is a three-dimensional view of a multiple layers of a material that can be used to encompass the sensor capacitor and the reference capacitor in the force-measuring device 150 of FIG. 1, according to one embodiment. Particularly, FIG. 4B illustrates a middle cylinder 404B formed with multiple blocks of material according to one embodiment. The middle cylinder 404B may be formed from layers (e.g., layers 406A-406N) each laser cut (e.g., laser etched) and/or patterned (e.g., to form the middle cylinder 404B at a cost lower than milling techniques for a single block as may be required in the middle cylinder 404A of FIG. 4A). For example, the layers 406A-406N may be a standard metal size and/or shape, thereby reducing the cost of fabricating the middle cylinder 404B.

Figure 5A:
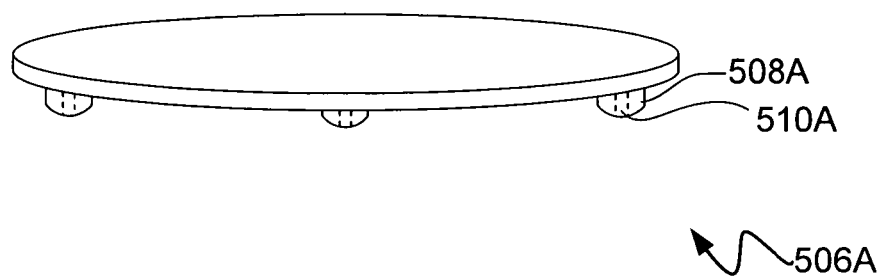
FIGS. 5A and 5B are three-dimensional views of support bases which attach to a bottom surface of the force-measuring device, according to one embodiment.
Figure 5B:
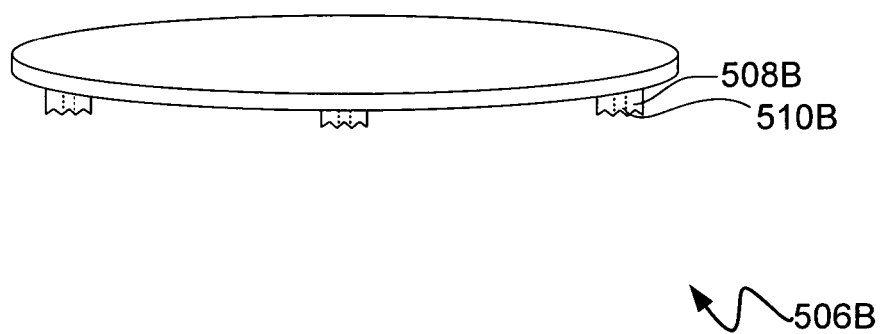

FIGS. 5A and 5B are three-dimensional views of support bases 508 which attach to a bottom surface of the force-measuring device 150 of FIG. 1, according to one embodiment. The bottom plate 506 may be formed when the multiple number of support bases 508 are affixed (e.g., through molding, welding, milling, etc.) to a single layer of material (e.g., such as the layers 406A-406N of FIG. 4). The multiple number of support bases 508 (e.g., in a form of foot, leg, etc) may provide a stable way of mounting the force-measuring device 150 of FIG. 1 to a surface by providing an optimal contact between the force-measuring device 150 and the surface (e.g., when the force-measuring device 150 is mounted on the surface). In one example embodiment, three legs are selected to provide the optimal contact between the force-measuring device 150 and the surface.

In another example embodiment, different shapes of the support bases 508 may be utilized to optimize the contact between the force-measuring device 150 and the surface. FIG. 5A is a three-dimensional view of the bottom plate 506A having convex support bases 508A, according to one embodiment. The three convex support bases 508A may be used to optimize the contact between the force-measuring device 150 and the surface (e.g., when the force-measuring device 150 is being mounted on the surface). In this case, the convex shape may provide stability to the force-measuring device 150 via limiting a contact area between the convex support bases 508A and the surface (e.g., uneven, irregular, etc.) to their tips (e.g., in order to decrease instability due to the uneven and/or irregular surface). The hole 510A (e.g., threaded or unthreaded) at a center of the convex support base 508A may be used to adjoin the bottom plate 506A of the force-measuring device 150 with the surface using a fastener (e.g., a screw, a bolt, etc.).

FIG. 5B is a three-dimensional view of the bottom plate 506B with saw-blade support bases 508B, according to one embodiment. The saw-blade support bases 508B may be also used to optimize the contact between the force-measuring device 150 and the surface. Here, the saw-blade shape may be employed to increase stability to the force-measuring device 150 mounted on the surface through limiting a contact between the saw-blade support bases 508B and the surface to ridges of teeth (e.g., of the saw-blade support bases 508B). In one example embodiment, gullets of the saw-blade support bases 508B may substantially absorb instability due to an irregular nature of the surface. The hole 510B may be used to fasten the force-measuring device 150 to the surface with a fastener.

Figure 6A:
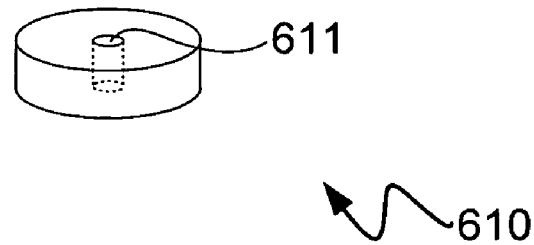
FIGS. 6A, 6B, and 6C are exploded views of a modular spacer, an upper sensor printed circuit board (PCB) of the sensor capacitor, and a screw which connects to the top nut of FIG. 2, respectively, according to one embodiment.
Figure 6B:
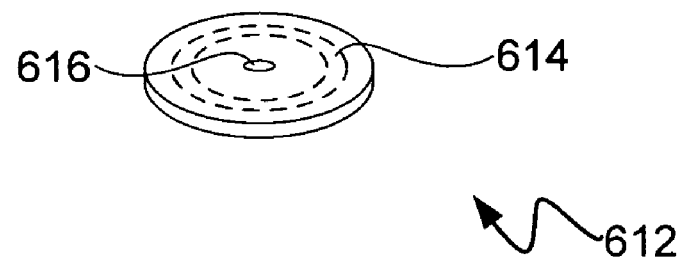
Figure 6C:
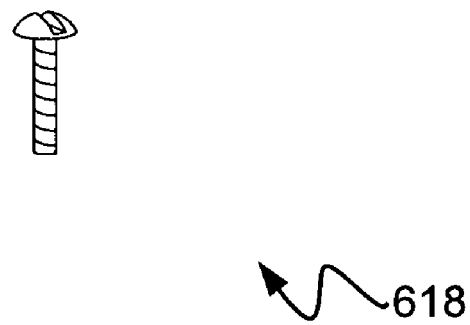

FIGS. 6A, 6B, and 6C are exploded views of a modular spacer 610, an upper sensor PCB 612 of the sensor capacitor, and a screw 618 which connects to the top nut 200 of FIG. 2, respectively, according to one embodiment. FIG. 6A is an exploded view of the modular spacer 610 which is located between the cover plate 102 of FIG. 1 and the upper sensor PCB 612, according to one embodiment. The modular spacer 610 (e.g., made of metal, high-strength alloy, etc.) having a hole 611 at its center may be placed between the cover plate 102 and the upper sensor PCB 612 to provide a gap between the upper ring surface 614 of the sensor capacitor and the lower ring surface 722 of the sensor capacitor. The gap can be filled with a dielectric material (e.g., air, inert gas, and/or another dielectric material). The modular spacer 610 may also be used to buffer an effect of the force (e.g., the force 112 of FIG. 1) on the upper sensor PCB 612.

FIG. 6B is an exploded view of the upper sensor PCB 612 having the upper ring surface 614, according to one embodiment. The upper sensor PCB 612 (e.g., in a disk) may have a hole 616 which penetrates the upper sensor PCB 612 at the center and the upper ring surface 614 painted (e.g., sputtered, coated, etc.) on a bottom of the upper sensor PCB 612. FIG. 6C is an exploded view of a screw 618 with a thread. In example embodiment, a fastener (e.g., the screw 618) may affix the upper sensor PCB 612 and the modular spacer 610, and the cover plate 302 of FIG. 3 to the lower inner chamber of the top nut 200 of FIG. 2 through the hole 616, the hole 611, and the hole 306.

Figure 7A:
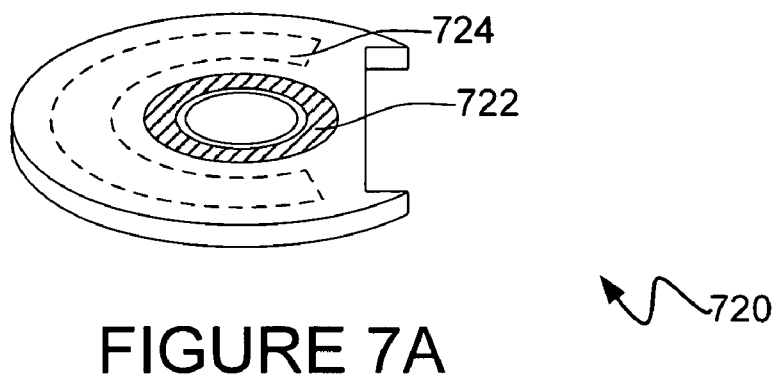
FIGS. 7A, 7B, and 7C are exploded views of a consolidated PCB, a reference spacer, and a bottom reference sensor PCB of the reference capacitor with a layered circuit board, according to one embodiment.
Figure 7B:
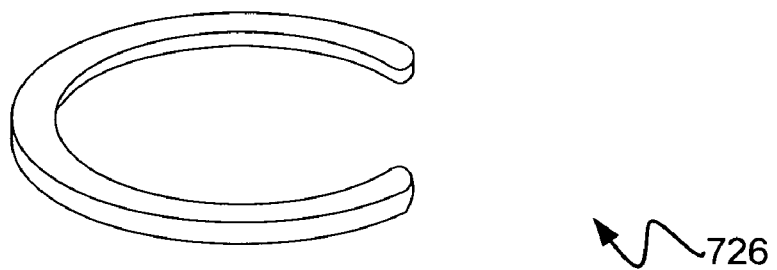
Figure 7C:
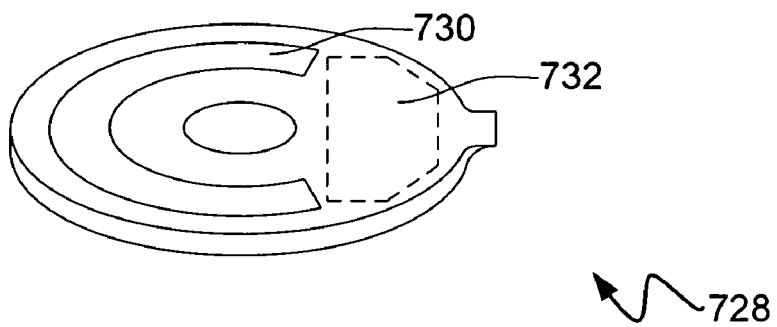

FIGS. 7A, 7B, and 7C are exploded views of a consolidated PCB 720, a reference spacer 726, and a lower reference sensor PCB 728 of the reference capacitor with a layered PCB 732, according to one embodiment. FIG. 7A is an exploded view of the consolidated PCB 720 which has both the lower ring surface 722 and the upper surface 724 painted (e.g., sputtered, coated, etc.) on the consolidated PCB 720. A lower ring surface 722 is painted (e.g., sputtered, coated, etc.) on a top surface of the consolidated PCB 720. With the upper ring surface 614 of FIG. 6, the lower ring surface 722 may form the sensor capacitor that stores energy in an electric field created between a pair of conductors (e.g., the upper ring surface 614 and the lower ring surface 722) on which equal but opposite electric charges have been placed. In one embodiment, the upper ring surface 614 and the lower ring surface 722 (e.g., which forms the sensor capacitor) are substantially parallel to each other and have an equal physical area and/or thickness.

The consolidated PCB 720 also has an upper surface 724 (e.g., which may be designed in a different shape) painted (e.g., sputtered, coated, etc.) on a bottom surface of the consolidated PCB 720. A surface area of the upper surface 724 (e.g., as well as the lower surface 730) of the reference capacitor may be substantially larger than an area of the lower ring surface 722 (e.g., as well as the upper ring surface 614) of the sensor capacitor to reduce the amount of amplification required when generating a measurement of the force 112 applied to the cover plate 102 in one embodiment.

FIG. 7B is an exploded view of the reference spacer 726, according to one embodiment. The reference spacer 726 may be created from an insulating material (e.g., a plastic, a polymer, a foam, etc.). The reference spacer 726 may create a gap between the upper surface 724 and the lower reference surface 730. The gap can be filled with air or any other gas (e.g., an inert gas). In one embodiment, the reference spacer 726 is rigid and does not deflect when the force 112 (e.g., as illustrated in FIG. 1) is applied to the cover plate 102. In another embodiment, the reference spacer 726 expands and/or contracts when the force 112 is applied to the cover plate 102 because a pressure of the reference spacer 726 increases and/or decreases when the force 112 is applied to the cover plate 102.

FIG. 7C is an exploded view of a lower reference sensor PCB 728 having the lower surface 730 and a layered PCB 732, according to one embodiment. The lower surface 730 may be painted (e.g., sputtered, coated, etc.) on the lower reference sensor PCB 728 to provide a lower conductive surface of the reference capacitor. The layered PCB 732 (e.g. of the lower reference sensor PCB 728) may include a ground plane layer, a power plane layer, and/or one or more signaling layers having a circuit which generates a measurement (e.g., of capacitance) encased by the ground plane layer and the power plane layer. The signaling layer may include a circuit to wirelessly (e.g., using a Bluetooth technology) communicate the measurement with a data processing system, a circuit to communicate an alarm signal when the load exceeds a threshold value (e.g., a maximum load the force-measuring device 150 of FIG. 1 can handle), and/or a universal serial bus (USB) to provide a hardware interface (e.g., for a data processing system and/or peripheral devices).

Figure 10:
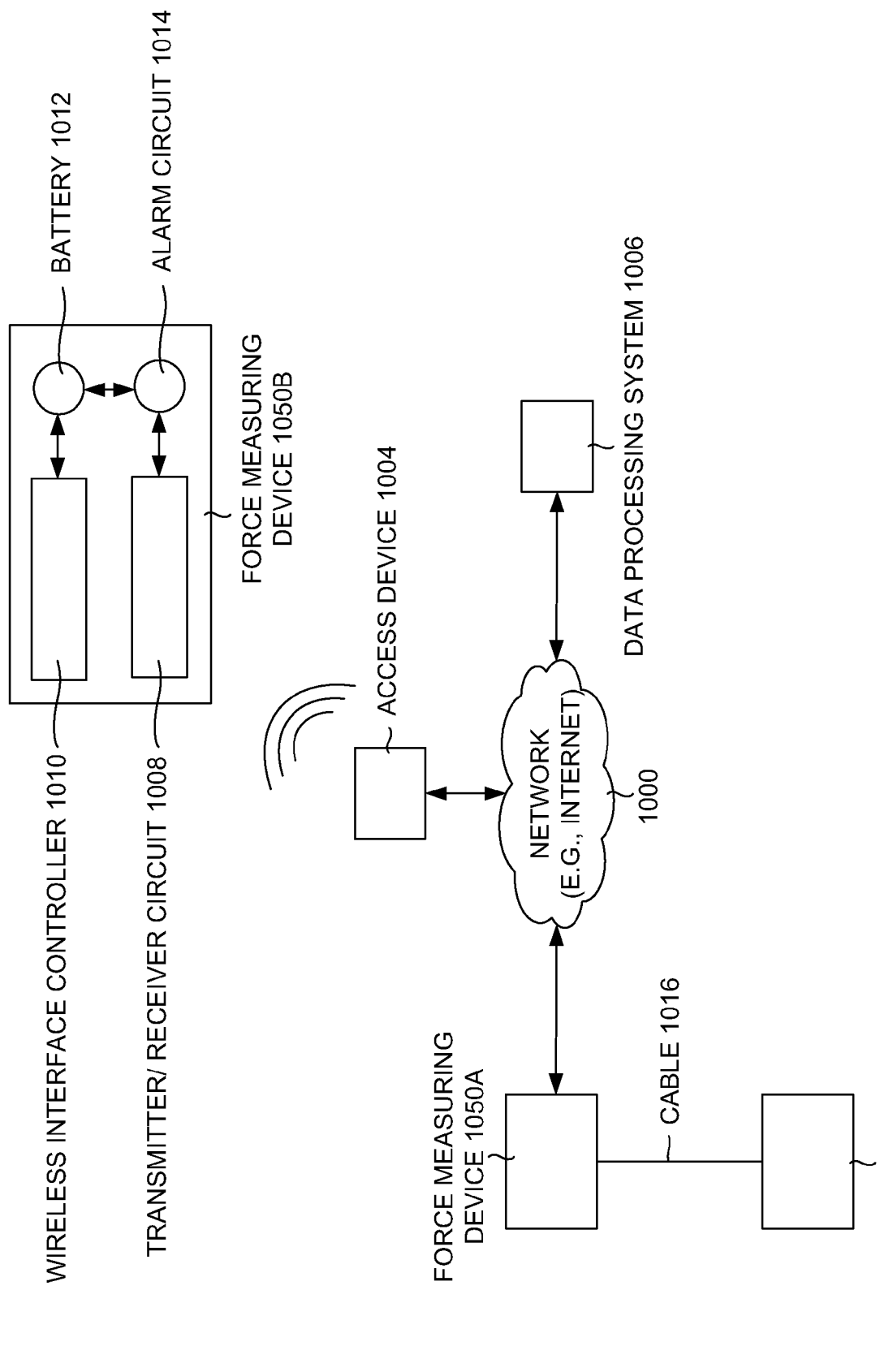
FIG. 10 is a network enabled view of a force-measuring device, according to one embodiment.

The lower reference sensor PCB 728 of FIG. 7C may include a connector that connects the force-measuring device 150 (e.g., as illustrated in FIG. 1) to the data processing system 1002 (e.g., as illustrated in FIG. 10) through the cable 1016. The signaling layer of the layered PCB 732 may be used to generate a measurement (e.g., by following operations illustrated in FIG. 11) based on a change in a distance between the upper ring surface 614 of FIG. 6B and the lower ring surface 722 of FIG. 7A. In addition, the signaling layer may generate a measurement of the sensor capacitor after removing an effect of the environmental condition from a capacitance of the sensor capacitor (e.g., by subtracting the changes in the reference capacitor, which may be only affected by environmental conditions). An extension of PCB may be located directly next to the signaling layer to allow for the connector of the cable 1016 of FIG. 10 to sit in the bottom plate 106 (e.g., of FIG. 1).

Figure 8:
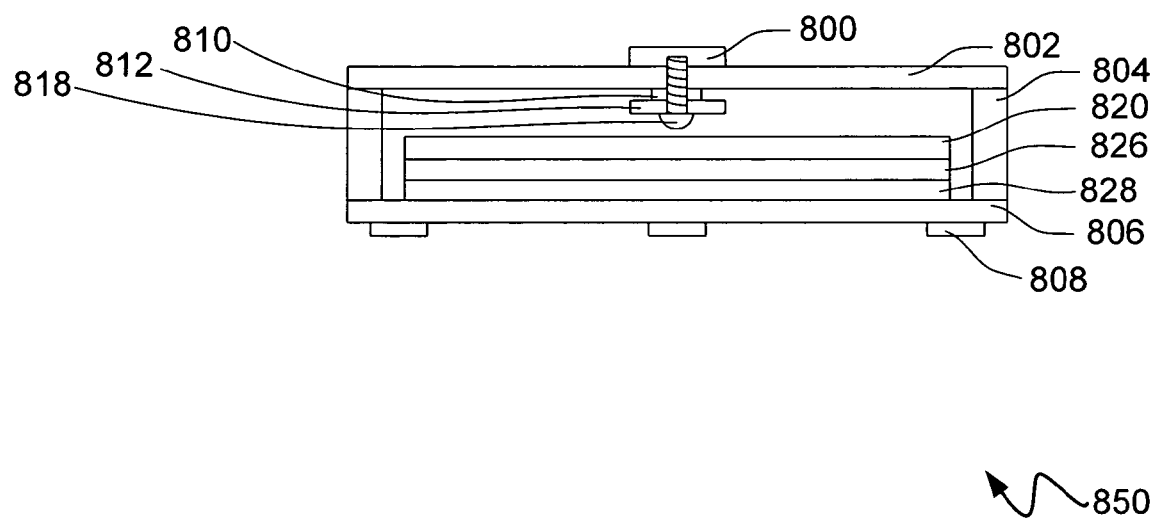
FIG. 8 is a two dimensional vertical view of a force-measuring device, according to one embodiment.

FIG. 8 is a two dimensional vertical view of a force-measuring device 850, according to one embodiment. The force measuring device 850 encompasses a sensor capacitor, a reference capacitor, and a layered circuit in a cylindrical housing (e.g., made of a conductive material and/or a nonconductive material to isolate any electronic module in the cylindrical housing from an external electromagnetic noise). In example embodiment, the cylindrical housing includes a cover plate 802, a middle cylinder 804, and a bottom plate 806. Three support bases (e.g., feet) may be affixed to the cylindrical housing (e.g., through welding, molding, milling, etc.) to provide an optimum contact between the cylindrical housing and a mounting surface.

The cover plate 802, a modular spacer 810, and an upper sensor PCB 812 is adjoined together via fastening with a screw 818 to a bottom inner chamber of a top nut 800. A consolidated PCB 820, a reference spacer 826, and a lower reference sensor PCB 828 may be coupled (e.g., screwed onto, bonded, etched, glued, affixed, etc.) to the bottom plate 806.

A deflection of the cover plate 802 may cause a change in a distance between the upper sensor PCB 812 and the consolidated PCB 820. The change in the distance may bring about a change in capacitance of a sensor capacitor (e.g., the sensor capacitor may be formed by two parallel conductive surfaces—such as the upper ring surface 614 painted on a bottom surface of the upper sensor PCB 812 and the lower ring surface 722 painted on a top surface of the consolidated PCB 820 as illustrated in FIG. 6B and FIG. 7A—separated by a dielectric material). In one embodiment, the two parallel conductive surfaces are substantially parallel to each other and have the same physical area and/or thickness. The change in capacitance of the sensor capacitor may be inversely proportional to the change in the distance between the two parallel conductive surfaces in one embodiment.

In another embodiment, a reference capacitor formed by an upper conductive surface (e.g., the upper surface 724 of FIG. 7A) painted on a bottom surface of the consolidated PCB 820 and a lower conductive surface (e.g., the lower surface 730 of FIG. 7C) painted on a top of the lower reference sensor PCB 828. The reference sensor may experience a change in capacitance only for environmental factors (e.g., humidity in a gap between the first conductive surface and the second conductive surface, a temperature of the force-measuring device 850, and an air pressure of an environment surrounding the force-measuring device 850, etc.). Therefore, the environmental factors can be removed from a measurement of a change in capacitance of the sensor capacitor when the force 112 is applied to the force-measuring device 850 (e.g., thereby allowing a user to determine the change in capacitance of the sensor capacitor more accurately).

Figure 9A:
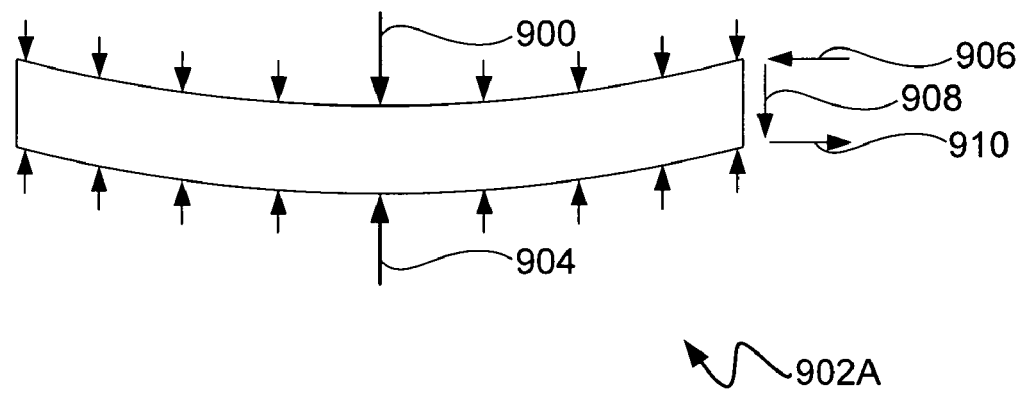
FIGS. 9A and 9B are conceptual views of the cover plate of the force-measuring device of FIG. 1 when a force is being applied on the cover plate, according to one embodiment.
Figure 9B:
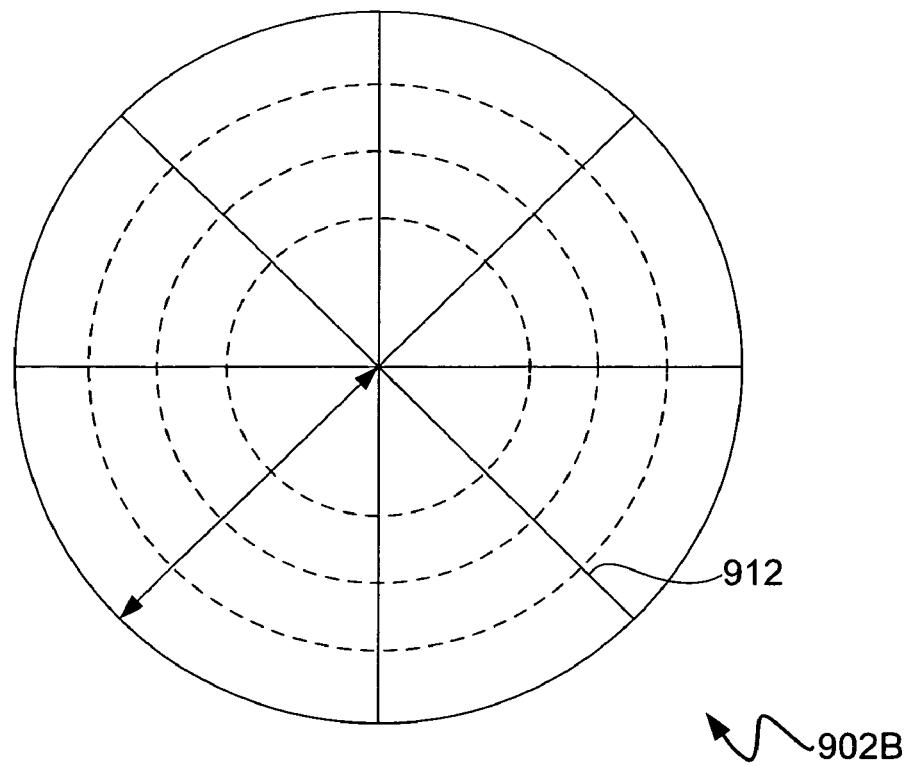

FIGS. 9A and 9B are conceptual views of the cover plate 902 of the force-measuring device 150 of FIG. 1 when a force 900 is being applied on the cover plate 902, according to one embodiment. More particularly, FIG. 9A displays internal and external forces and an axial stress distribution across a vertical cross-section of the cover plate 902A in deflection, according to one embodiment. A capacitance is calculated as "capacitance=(a dielectric constant multiplied by an area of overlap in two parallel conductive surfaces of a capacitor) divided by (distance between the two parallel conductive surfaces in response to the force). Thus, the capacitance may be affected by the dielectric constant, the area of overlap, and/or the distance between the two parallel conductive surfaces.

If a user were to design the force-measuring device 150 of FIG. 1 which uses less amplification of a measurement (e.g., thereby avoiding amplification of an error in the measurement as much as possible), the dielectric constant, the area of overlap, and/or the distance between the conductive surfaces may be calibrated to produce a higher capacitance to begin with. Because the dielectric constant and the area of overlap may not be so readily adjustable between two measurements (e.g., initially without a force being applied and then with a force), the distance between the two parallel conductive surfaces may be changed when the cover plate 902 of the force-measuring device 150 is deflected by the force 900 applied on the cover plate 902.

A deflection rate of a material (e.g., the cover plate 902, the housing of the force-measuring device) may be determined by a number of factors (e.g., depending on a type of the material, a size of an object, a geometry of the object, and forces applied to the object). Here, the geometry of the cover plate (e.g., in a circular shape) may be aimed to provide a lower resistance to the deflection of the cover plate 902, thereby allowing the cover plate of the circular shape to bend more readily than a cover plate of a different shape (e.g., a square shape).

This can be determined from a calculation of a second moment of area (e.g., also known as a second moment of inertia) for a number of geometries. The second moment of area is a property of an object that is used to predict the object's resistance to bending and deflection. For instance, the second moment of area of the object measures the object's ability to resist bending. Hence, the less the second moment of area is the more bendable the object becomes.

The second moment area of a circle (e.g., R as a radius of the circle) is calculated by a formula, i.e., $I=\pi R^4/4$. The second moment area of a square (e.g., 2R as a side of the square) is calculated by a different formula, i.e., $I=16R^4/12$. Based on a comparison between the second moment of area of the circle and the second moment of area of the square, it may be determined that the second moment area of the circle is less than the second moment area of the square. This may mean the resistance of a circular object against a force being applied on it may be less than the resistance of a square object, hence more bending of the circular object giving a greater change in distance between the two parallel conductive surfaces than the square object.

In another example embodiment, a groove may be formed (e.g., by cutting, etching, molding, milling, etc) to substantially confine the force 900 within a radius of the groove. The radius of the groove is less than the radius of the cover plate 902 (e.g., in a circular shape), hence the second moment area of the cover plate 902 with the groove may be less than the second moment area of the cover plate 902 without the groove. Thus, the groove will give higher deflection of the cover plate 902, hence more distance change in the two parallel conductive surfaces of the capacitive sensor.

In yet another example embodiment, a proper size of a cylindrical object (e.g., lower cylinder 208 of FIG. 2) protruding from a bottom surface of a top nut (e.g., the top nut 200 of FIG. 2) coupled to the cover plate 902 may be designed to calibrate a deflection rate of the cover plate 902. The area of the cylindrical object may confine a sizable portion of the force 900 applied to the cover plate 902. For example, the narrower the area of the cylindrical object touching the cover plate 902 is the more confined the force 900 within the area, hence more deflection of the cover plate 902.

Another effect of the force 900 being applied on the cover plate 902 may be deformation (e.g., a change in shape due to the force) of the cover plate 902 and/or the housing. This may be a result of tensile (e.g., pulling), compressive (e.g., pushing), shear, bending and/or torsion (e.g., twisting) forces. In FIG. 9A it can be seen that a force 900 may cause a deformation in the cover plate 902 (e.g., similar to the cove plate 102 of FIG. 1). The force 900 may produce reactive forces (e.g., as well as a reactive force 904 directly against the force 900) inside the cover plate 902 as the cover plate 902 attempts to accommodate the force 900. The material at the top of the cover plate 902 may be compressed while the material at the bottom may be stretched. There are three notable internal forces caused by lateral loads—shear parallel to the lateral loading, compression along the top of the cover plate 902, and tension along the bottom of the cover plate 902. The compression and tension may form a couple or moment as they are equal in magnitude and opposite in direction. This deflection moment may produce a sagging deformation characteristic of an object experiencing deflection and/or bending.

A metal fatigue may be faults introduced at the molecular level with each deformation. In some cases, a material deformed only within the elastic (e.g., transient in nature) range may not be returned completely to its original state even after forces on the material are removed. As such, after many deformations, cracks will begin to appear, followed soon after by a fracture, with no apparent plastic (e.g., permanent in nature) deformation in between. In one example embodiment, the cover plate 902 of a circular shape may be used to evenly distribute the forces external and/or internal to the cover plate 902, as illustrated in FIG. 9B. Here, an equal force (e.g., caused by a force applied at the center of the cover plate 902) of compression may be applied along the top of the cover plate 902, and an equal force of tension may be applied along the bottom of the cover plate 902.

In another embodiment, the cover plate may be square. This may result in non-uniform forces of compression along the top of the cover plate 902 and non-uniform forces of tension along the bottom of the cover plate 902 because a distance between a center of the cover plate and the edge of the cover plate may be different depending on a location and/or direction of the forces. For example, the shortest distance between the center of the cover plate 902 and the edge of the cover plate 902 may be "D", whereas the longest distance between the center of the cover plate 902 and the edge of the cover plate 902 may be "1.414*D." The differences in the forces may cause more wear and tear in a location where a greater compression and/or tension is being applied. Although a failure may require thousands, millions, billions, or trillions of deformations, some objects (e.g., because of their shapes) may be more prone to wear and tear than others.

FIG. 10 is a network enabled view of a force-measuring device 1050, according to one embodiment. A force-measuring device 1050A is connected to a data processing system 1002 through a cable 1016 as illustrated in FIG. 10. The force measuring device 1050A is also connected to a network 1000 (e.g., an internet, a local area network, etc.). A force-measuring device 1050B is wirelessly connected to the network 1000 through an access device 1004 (e.g., a device which enables wireless communication between devices forming a wireless network).

The force-measuring device 1050B includes a transmitter/receiver circuit 1008 and a wireless interface controller 1010 (e.g., for wireless communication), a battery 1012 (e.g., to sustain as a standalone device), and an alarm circuit 1014 (e.g., to alert a user when the force to the force-measuring device 1050B is greater than a threshold value and/or when the battery is almost out). The transmitter/receiver circuit 1008 and/or the wireless interface controller 1010 may be integrated into the processing module 1114 of FIG. 11.

A data processing system 1006 may receive data (e.g., output data measuring a force and/or a load, etc.) from the force-measuring device 1050A and/or the force-measuring device 1050B through the network 1000. In one embodiment, the data processing system 1006 analyzes data (e.g., measurements) generated by various operation of a force-measuring device (e.g., the force-measuring device 150). In another example embodiment, a universal serial bus (USB) may be included in the signaling layer (e.g., of the layered PCB 732 of FIG. 7) of the force measuring device 1050A and/or the force measuring device 1050B. The USB (e.g., a USB port or hub with mini sockets) may allow a hardware interface for a data processing system (e.g., the data processing system 1002 and/or the data processing system 1006) and/or a hardware interface for attaching peripheral devices (e.g., a flash drive).

Figure 11:
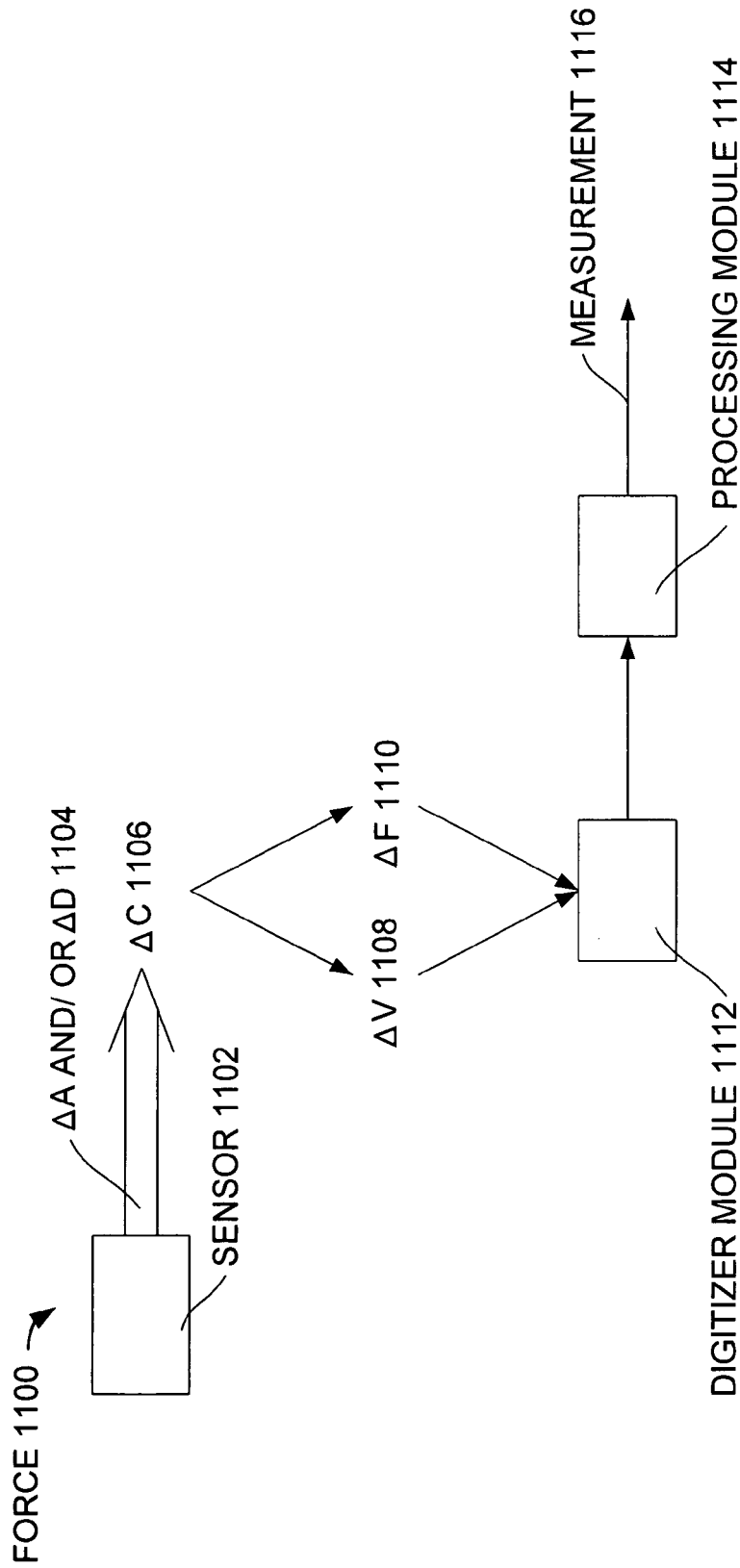
FIG. 11 is a process view of measuring a force, according to one embodiment.

FIG. 11 is a process view of measuring a force 1100, according to one embodiment. In FIG. 11, a force 1100 may be applied to a sensor 1102 (e.g., consisting of the upper sensor PCB 612 of FIG. 6 and the consolidated PCB 720 of FIG. 7) when the cover plate 102 of FIG. 1 is deflected by the force 1100, according to one embodiment. An electronic circuitry (e.g., a software and/or hardware code) may apply an algorithm to measure a change in a distance 1104 between two plates (e.g., the upper ring surface 614 of FIG. 6 and the lower ring surface 722 of FIG. 7 forming the sensor capacitor as illustrated in FIG. 6B and FIG. 7A) of the sensor capacitor when the force 112 of FIG. 1 is applied to a force-measuring device (e.g., the force-measuring device 150). In an alternate embodiment, a change in area between the plates may be considered rather than the change in the distance.

Next, a change in capacitance 1106 may be calculated based on the change in the distance between the two plates forming the sensor capacitor. The change in capacitance 1106, a change in a voltage 1108, and/or a change in a frequency 1110 may also be calculated to generate a measurement (e.g., an estimation of the force 1100 applied to the sensor 1102). Data which encompasses the change in capacitance 1106, the change in voltage 1108, and/or the change in frequency 1110 may be provided to a digitizer module 1112 (e.g., an analog-to-digital converter). Lastly, the digitizer module 1112 may work with a processing module 1114 (e.g., a microprocessor which may be integrated in a signaling circuit of the layered PCB 732 of FIG. 7) to convert the change in capacitance 1106, the change in voltage 1108, and/or the change in frequency 1110 to a measurement 1116 (e.g., a measurement of the force 1100 applied to the sensor 1102).

Figure 12:
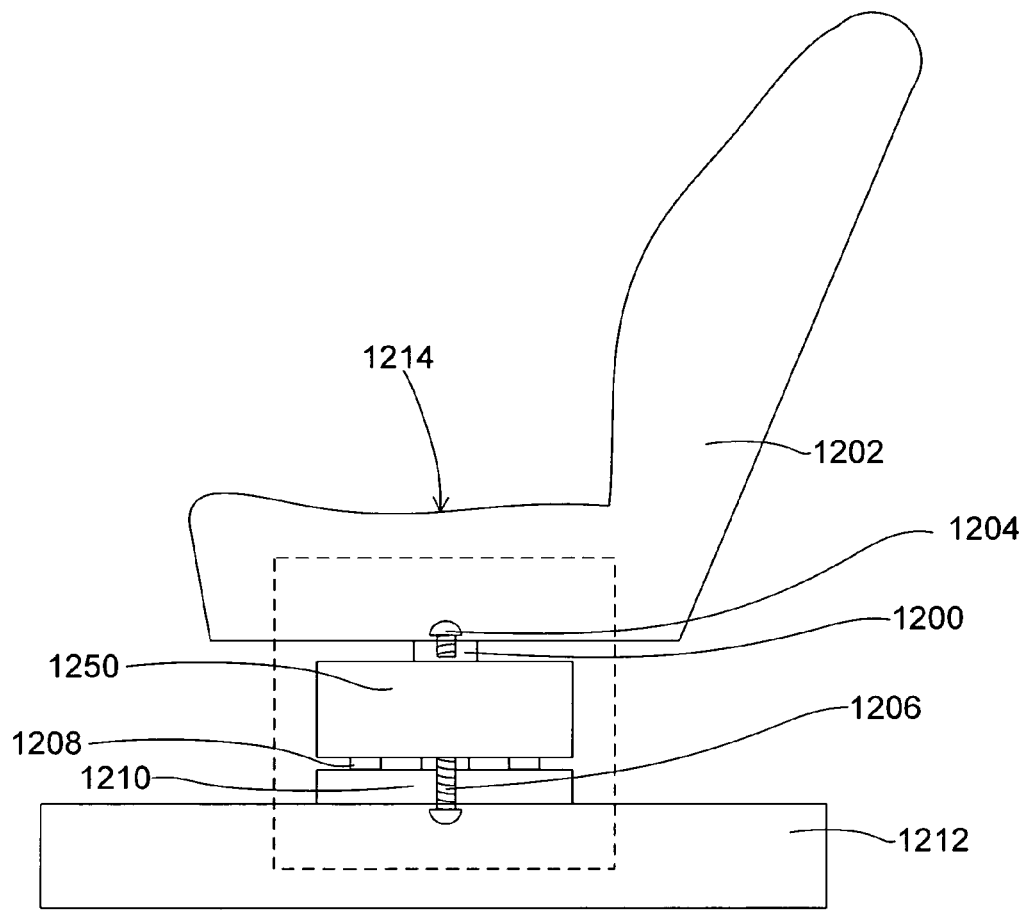
FIG. 12 is the force-measuring device of FIG. 1 mounted underneath of a seat, according to one embodiment.

FIG. 12 is a weight (e.g., which is a type of force) measuring device 1250 having a sensor capacitor (e.g., a variable capacitor) and a reference capacitor, according to one embodiment. The weight measuring device 1250 (e.g., which attaches to a car seat, an airplane passenger seat, etc.) includes an upper bolt 1204 affixing a seat 1202 to the weight measuring device 1250 and a lower bolt 1206 affixing the weight measuring device 1250 to a mounting rail 1212 through a block 1210 (e.g., made of a rigid material) as a junction point between the weight measuring device 1250 and the mounting rail 1212.

An applied weight 1214 (e.g., of a person sitting on a seat an automobile) may exert a force on the weight measuring device 1250. A top nut 1200 may provide a junction point between the upper bolt 1204 to the seat 1202 and an upper surface of the weight measuring device 1250 (e.g., the upper surface of the weigh measuring device 1250 may be similar to the cover plate 102 in FIG. 1). In another embodiment, the support bases 1208 may be directly fastened to the mounting rail 1212 with fasteners (e.g., screws, bolts, etc.) penetrating threaded or unthreaded inner chambers of the support bases 1208.

Figure 13:
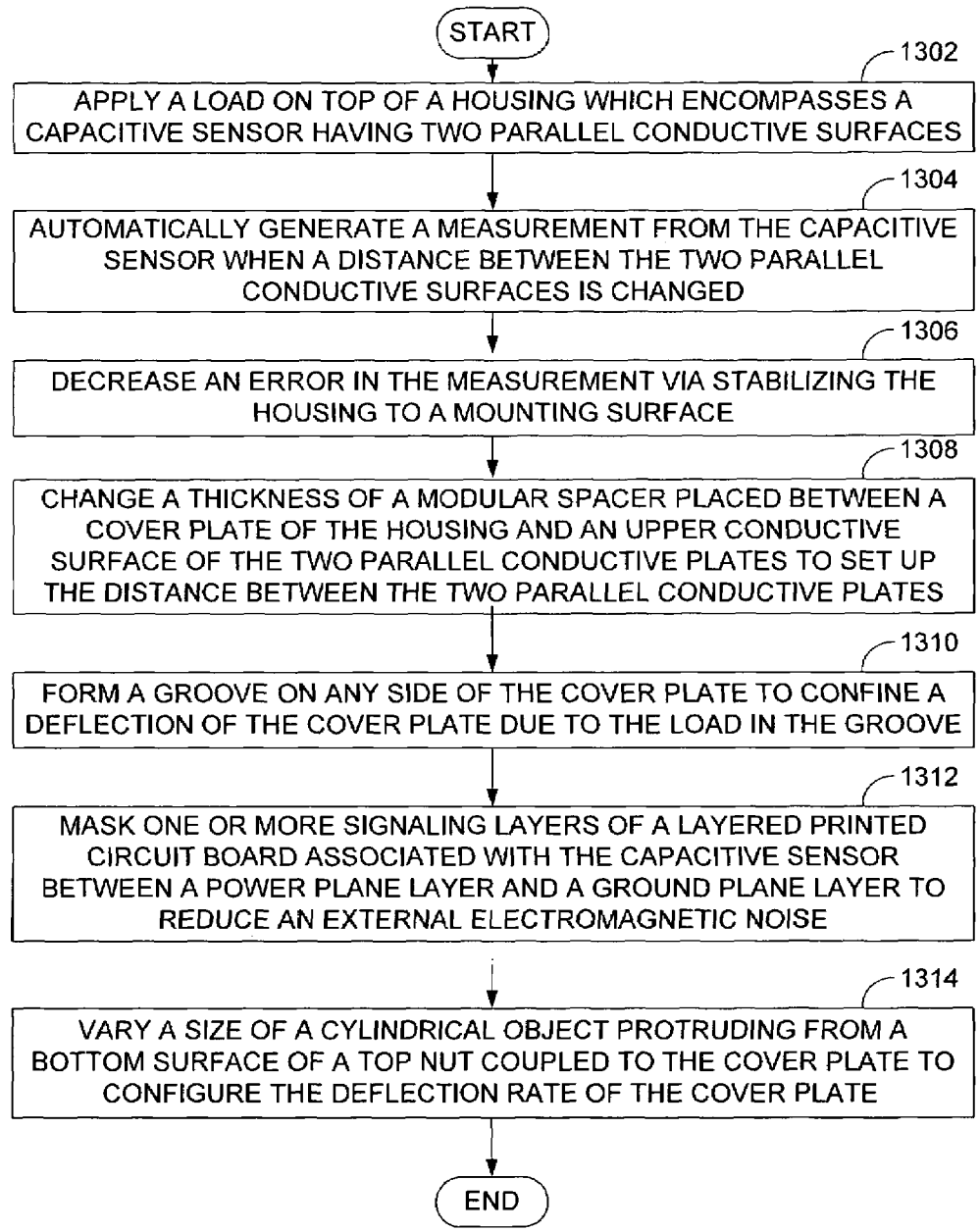
FIG. 13 is a process flow of generating a measurement from a capacitive sensor while decreasing an error in the measurement in a number of ways, according to one embodiment.

FIG. 13 is a process flow of generating a measurement from a capacitive sensor (e.g., in the force-measuring device 150 of FIG. 1) while decreasing an error in the measurement in a number of ways, according to one embodiment. In operation 1302 a force (e.g., a load, a weight, etc.) may be applied on top of a housing (e.g., of the force-measuring device 150 of FIG. 1) which encompasses a capacitive sensor having two parallel conductive surfaces to produce a deflection of a cover plate (e.g., the cover plate 102) of the housing. A measurement (e.g., of capacitance) may be automatically generated in operation 1304 from the capacitive sensor when a distance between the two parallel conductive surfaces is changed due to the deflection of the cover plate. In operation 1306, an error in the measurement may be decreased via stabilizing the housing to a mounting surface (e.g., using a multiple number of supporting bases of various shapes).

A thickness of a modular spacer placed between the cover plate of the housing and an upper conductive surface (e.g., the upper ring surface 614 of FIG. 6) of the two parallel conductive surfaces may be changed to set up the distance (e.g., of an initial state) between the two parallel conductive plates in operation 1308. In operation 1310, a groove (e.g., where a depth and a width of the groove is mathematically calibrated to configure a rate of a deflection of the cover plate) may be formed (e.g., by cutting, etching, milling, etc.) on any side (e.g., a top surface and/or a bottom surface) of the cover plate to confine the deflection of the cover plate due to the force in the groove.

In operation 1312, one or more signaling layers (e.g., which may include a circuit to communicate an alarm signal when the force exceeds a threshold value and/or a universal serial bus) of a layered PCB associated with the capacitive sensor may be masked between a power plane layer and a ground plane layer to reduce an external electromagnetic noise. A size of a cylindrical object protruding from a bottom surface of a top nut coupled to a cover plate may be varied in operation 1314 to configure the deflection rate of the cover plate.

Although the present embodiments have been described with reference to specific example embodiments, it will be evident that various modifications and changes may be made to these embodiments without departing from the broader spirit and scope of the various embodiments. For example, the signaling layer of the layered PCB 732 of FIG. 7C, the transmitter/receiver circuit 1008 of FIG. 10, the wireless interface controller 1010, an alarm circuit 1014, the digitizer module 1112 of FIG. 11, and/or the processing module 1114 described herein may be enabled and operated using hardware circuitry (e.g., CMOS based logic circuitry), firmware, software and/or any combination of hardware, firmware, and/or software (e.g., embodied in a machine readable medium).

For example, the digitizer module 1112 and/or the processing module 1114 may be enabled using software and/or using transistors, logic gates, and electrical circuits (e.g., application specific integrated ASIC circuitry) such as a digitizer circuit and/or a processing circuit. In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. An apparatus, comprising:
a capacitor having an upper conductive surface and a lower conductive surface parallel to the upper conductive surface;
a cylindrical housing with a cover plate to encompass the capacitor;
a sensor in the cylindrical housing to generate a measurement based on a change in a distance between the upper conductive surface and the lower conductive surface when the cover plate is deflected by a load applied on the cover plate; and a modular spacer between the cover plate and the upper conductive surface to provide a gap between the upper conductive surface and the lower conductive surface and to buffer an effect of the load on the upper conductive surface.

2. The apparatus of claim 1 wherein the cylindrical housing encompasses a reference capacitor to compensate an error in the measurement based on an environmental condition.

3. The apparatus of claim 1 further comprising coupling a plurality of support bases to a bottom surface of the cylindrical housing.

4. The apparatus of claim 3 wherein a shape of one end of the plurality of support bases contacting a mounting surface is designed to optimize a contact between the cylindrical housing and the mounting surface when the plurality of support bases are affixed on the mounting surface.

5. The apparatus of claim 4 wherein the shape is at least one of a convex shape and a saw blade shape.

6. The apparatus of claim 3 wherein three support bases are coupled to the cylindrical housing.

7. The apparatus of claim 1 further comprising forming a groove on at least one side of the cover plate to substantially confine a deflection of the cover plate in the groove.

8. The apparatus of claim 7 wherein a depth and a width of the groove is mathematically engineered to configure a sensitivity of the deflection of the cover plate.

9. The apparatus of claim 1 further comprising coupling a top nut affixed on a center of the cover plate and a support structure associated with the load fastened to an upper inner chamber of the top nut using an upper fastener, wherein the cover plate, a modular spacer and the upper conductive surface are fastened to a lower inner chamber of the top nut using a lower fastener.

10. The apparatus of claim 1 further comprising a layered printed circuit board associated with the sensor, wherein the layered printed circuit board includes a ground plane layer, a power plane layer, and at least one signaling layer having a circuit which generates the measurement and a USB circuit which provides a hardware interface encased by the ground plane layer and the power plane layer.

11. The apparatus of claim 1 wherein at least one signaling layer further includes a circuit to wirelessly communicate the measurement with a data processing system.

12. The apparatus of claim 1 wherein the cylindrical housing is made of at least one of a conductive material and a non conductive material to isolate any electronic module in the cylindrical housing from an external electromagnetic noise.

13. A method, comprising:
applying a load on top of a housing which encompasses a capacitive sensor having two parallel conductive surfaces to produce a deflection of a cover plate of the housing;
automatically generating a measurement from the capacitive sensor when a distance between the two parallel conductive surfaces is changed due to the deflection of the cover plate;
decreasing an error in the measurement via stabilizing the housing to a mounting surface; and
changing a thickness of a modular spacer placed between the cover plate of the housing and an upper conductive surface of the two parallel conductive surfaces to set up the distance between the two parallel conductive plates.

14. The method of claim 13 further comprising forming a groove on any side of the cover plate to confine the deflection of the cover plate due to the load in the groove, wherein a depth and a width of the groove is mathematically calibrated to configure a rate of the deflection.

15. The method of claim 13 further comprising masking at least one signaling layer of a layered printed circuit board associated with the capacitive sensor between a power plane layer and a ground plane layer to reduce an external electromagnetic noise.

16. The method of claim 15 further comprising the at least one signaling layer to include a circuit to communicate an alarm signal when the load exceeds a threshold value.

17. The method of claim 13 further comprising varying a size of a cylindrical object protruding from a bottom surface of a top nut coupled to a cover plate to configure a deflection rate of the cover plate.

18. The method of claim 13 in a form of a machine-readable medium embodying a set of instructions that, when executed by a machine, cause the machine to perform the method of claim 13.

* * * * *